(12) United States Patent
Smith, III et al.

(10) Patent No.: US 8,800,259 B2
(45) Date of Patent: Aug. 12, 2014

(54) THRUST VECTOR SYSTEM

(75) Inventors: Crawford F. Smith, III, Carmel, IN (US); Steve Bergeron, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 1257 days.

(21) Appl. No.: 12/284,389

(22) Filed: Sep. 22, 2008

(65) Prior Publication Data
US 2011/0168809 A1 Jul. 14, 2011

(51) Int. Cl.
*B63H 1/00* (2006.01)
*F02K 1/00* (2006.01)

(52) U.S. Cl.
USPC ............ 60/204; 60/228; 60/230; 60/231; 239/265.17; 239/265.23

(58) Field of Classification Search
USPC ......... 60/222, 226.1, 226.3, 228, 230, 231, 60/266; 239/127.1, 127.3, 265.11, 265.17, 239/265.19, 265.23
See application file for complete search history.

(56) References Cited

U.S. PATENT DOCUMENTS

| | | | |
|---|---|---|---|
| 4,063,685 A | 12/1977 | Jacobs | |
| 4,686,824 A | 8/1987 | Dunaway et al. | |
| 4,828,173 A * | 5/1989 | Guerty | 239/1 |
| 5,184,461 A * | 2/1993 | Stransky et al. | 60/226.3 |
| 5,435,489 A | 7/1995 | Jenkins et al. | |
| 5,706,650 A | 1/1998 | Thayer | |
| 5,996,936 A | 12/1999 | Mueller | |
| 6,112,512 A | 9/2000 | Miller et al. | |
| 6,112,513 A | 9/2000 | Catt et al. | |
| 6,298,658 B1 | 10/2001 | Bak | |
| 6,679,048 B1 | 1/2004 | Lee et al. | |
| 6,962,044 B1 | 11/2005 | Miller et al. | |
| 7,509,797 B2 * | 3/2009 | Johnson | 60/228 |
| 7,836,681 B2 * | 11/2010 | Pesyna et al. | 60/228 |
| 2005/0274117 A1 * | 12/2005 | Sheoran et al. | 60/782 |
| 2006/0242942 A1 | 11/2006 | Johnson | |

FOREIGN PATENT DOCUMENTS

| | | |
|---|---|---|
| EP | 1 158 156 A2 | 11/2001 |
| EP | 1 158 156 A3 | 10/2003 |
| GB | 2 425 516 A | 11/2006 |
| GB | 2 425 573 A | 11/2006 |

OTHER PUBLICATIONS

C.A. Hunter and K.A. Deere, Computational Investigation of Fluidic Counterflow Thrust Vectoring, Jun. 20-23, 1999, AIAA 99-2669, American Institute of Aeronautics and Astronautics, Reston, VA, U.S.A.

Jeffrey D. Flamm, Experimental Study of a Nozzle Using Fluidic Counterflow for Thrust Vectoring, Jul. 13-15, 1998, AIAA 98-3255, American Institute of Aeronautics and Astronautics, Restoon, VA, U.S.A.

Extended European Search Report, EP 09 01 1986, 09011986.8-1754/2165929, Feb. 8, 2013.

European Office Action, EP 09011986.8, Rolls-Royce North American Technologies, Inc., Oct. 16, 2013.

* cited by examiner

*Primary Examiner* — Ehud Gartenberg
*Assistant Examiner* — Arun Goyal
(74) *Attorney, Agent, or Firm* — Krieg DeVault LLP

(57) ABSTRACT

In one embodiment, a nozzle of a gas turbine engine may be provided having a coanda injector and a fluidic injector which operate together to provide for a change in exhaust flow direction. The fluidic injector may be coincident with or downstream of the coanda injector and both may be used in high pressure ratio operations of the nozzle. The fluidic injector may be positioned opposite the coanda injector and, when activated, may provide for a region of separated flow on the same side of the nozzle as the fluidic injector. The coanda injector may provide additional momentum to an exhaust flow flowing through the nozzle and may encourage the flow to stay attached on the coanda injector side of the nozzle.

20 Claims, 6 Drawing Sheets

THRUST VECTOR SYSTEM

FIELD OF THE INVENTION

The present invention generally relates to flow field manipulation, and more particularly, but not exclusively, to thrust vectoring.

BACKGROUND

Improving the ability to change the direction of a flow field such as an engine exhaust, particularly but not exclusively at relatively high pressure ratios, remains an area of interest. Some existing systems have various shortcomings relative to certain applications. Accordingly, there remains a need for further contributions in this area of technology.

SUMMARY

One embodiment of the present invention is a unique flow field manipulation system. Other embodiments include apparatuses, systems, devices, hardware, methods, and combinations for vectoring gas turbine engine thrust. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
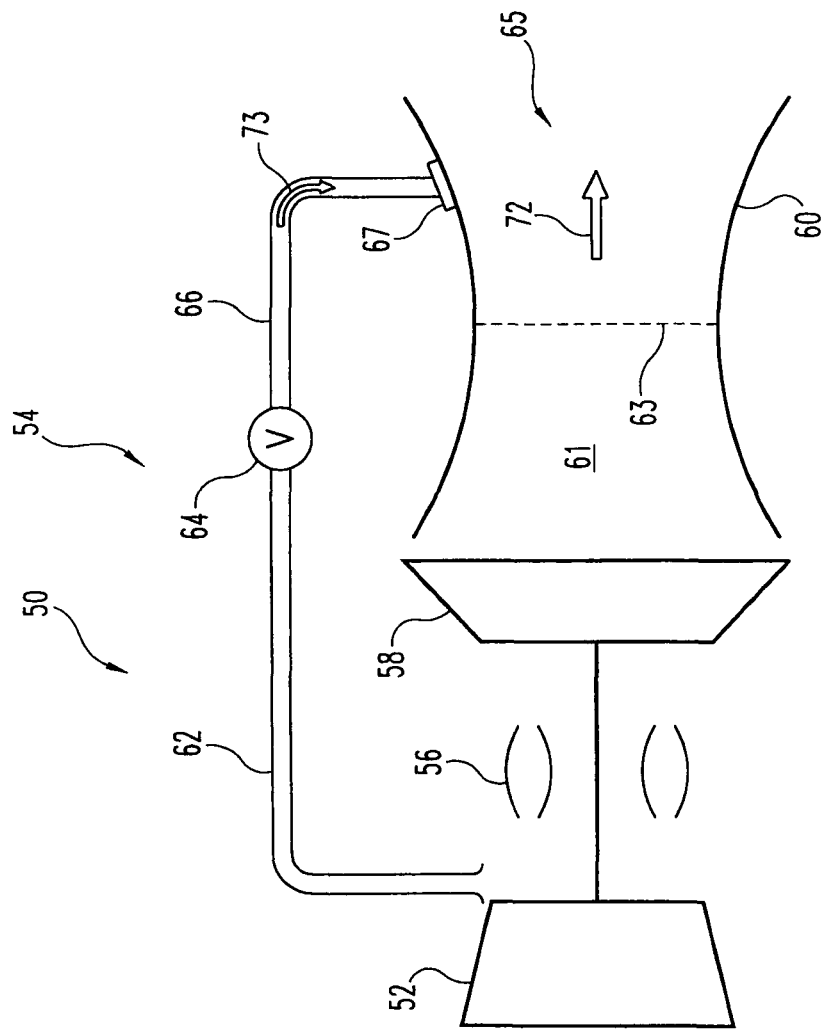
FIG. 1 is a schematic of a gas turbine engine including one form of the present application.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a schematic of one embodiment of a gas turbine engine 50 is shown. In one form, the gas turbine engine 50 includes a compressor 52, a compressed air subsystem 54, a combustor 56, a turbine 58, and a nozzle 60 which together may be used as an aircraft power plant. As used herein, the term "aircraft" includes, but is not limited to, helicopters, airplanes, unmanned space vehicles, unmanned combat aerial vehicles, tailless aircraft, missiles, fixed wing vehicles, variable wing vehicles, rotary wing vehicles, hover crafts, and others. The gas turbine engine 50 may take on a variety of forms such as a turbofan, turbojet, ramjet, and others, to set forth just a few non-limiting examples. The nozzle 60 may be used to direct an exhaust flow from the gas turbine engine 50. In some forms the nozzle 60 may be used to vector engine exhaust in a manner that produces an aircraft force or movement. Such a force or movement may supplement other aircraft control surface forces or movements, or may supplant such control surfaces. In one non-limiting example, the nozzle may be used on a tailless aircraft to provide a yawing moment. Other configurations are also possible.

Airflow enters the gas turbine engine 50 and is compressed by the compressor 52 before entering the combustor 54 where it is mixed with fuel and burned before being expanded by the turbine 58. The gas turbine engine 50 is depicted as an axial flow gas turbine engine, but other types of engines are contemplated in different embodiments, such as, but not limited to, centrifugal flow engines and hybrid engines.

The compressed air subsystem 54 may provide pressurized air at a variety of flow rates, temperatures, and pressures to the nozzle 60 and in one form includes a conduit 62, a valve 64, and a conduit 66. In the illustrative embodiment, the compressed air subsystem 54 is depicted as receiving air from a compressor discharge of the compressor 52, but in other embodiments the compressed air subsystem may receive compressed air from other sources. For example, the compressed air subsystem 54 may receive air from any stage of the compressor 52 upstream of the compressor discharge, or may receive air from another compressor or pump that may be in fluid communication with ambient air or some other source to set forth just a few non-limiting examples.

The conduits 62, 66 and the valve 64 may have any variety of variations for conveying pressurized air to the nozzle 60. For example, though a single conduit 62 is depicted as conveying pressurized air from the compressor discharge to the valve 64, other conduits or passageways may also be used. The valve 64 may be a simple shut-off valve, a pressure regulating valve, or may be a valve capable of metering air flow through the compressed air subsystem 54, to set forth just a few non-limiting examples. Also, similar to the conduit 62, the conduit 66 may be a single conduit conveying pressurized air from the valve 64 to the nozzle 60, but other embodiments may use more than one conduit or passage as will be discussed further hereinbelow. Other arrangements of the compressed air subsystem 54 are also contemplated herein.

In one form the nozzle 60 includes an interior 61, a throat 63, an exit 65, and an injector 67. The nozzle may be located downstream of the turbine 58 and may be operable to receive and convey an exhaust flow stream 72 from the gas turbine engine 50 as well as to receive a fluid flow 73 from the conduit 66 of the compressed air subsystem 54. Though the nozzle 60 is depicted as a convergent-divergent nozzle in the illustrative embodiment, other embodiments may use other types of nozzle configurations, such as a convergent nozzle to set forth just one non-limiting example. The fluid flow 73 is delivered to the interior 61 of the nozzle 60 to influence the exhaust flow stream 72. The injector 67 may be located downstream of the throat 63 in the illustrative embodiment, but may alternatively be located at or upstream of the throat in other embodiments. Further description of the nozzle 60 is provided hereinbelow. In addition, various embodiments of the injector 67 are also discussed further hereinbelow.

Figure 2:
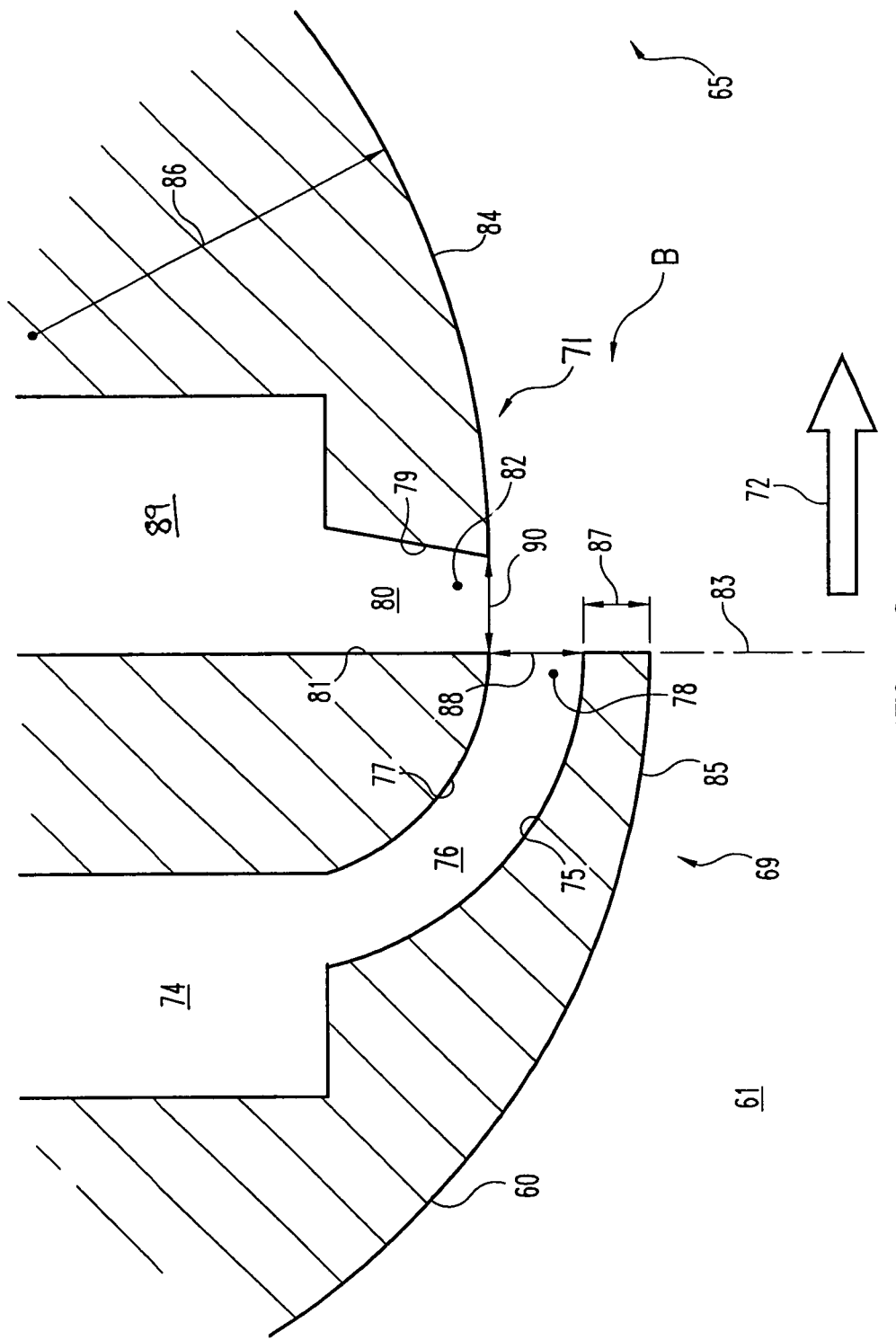
FIG. 2 is an illustrative view of one embodiment of an injector subsystem.

Turning now to FIG. 2, one form of the nozzle 60 is shown having a coanda injector 69 and a fluidic injector 71. The coanda injector 69 may be operable to flow pressurized air at a variety of flow rates and in one form includes a plenum 74, a conduit 76, an exit 78, and a coanda surface 84. Pressurized air from the compressed air subassembly 54 (depicted in FIG. 1) may be delivered to the plenum 74 before being conveyed by the conduit 76 to the exit 78. Though the coanda injector 69 of the illustrative embodiment includes the plenum 74, alternative embodiments may not include the plenum 74.

In one form the conduit 76 is defined in part by walls 75 and 77 and extends between the plenum 74 and the exit 78. The walls 75 and 77 are separated by an interwall distance 88 which may be maintained substantially constant along the length of the conduit 76. Some embodiments, however, may have an interwall distance that varies along the length of the conduit 76. To set forth just one non-limiting example, the interwall distance 88 may be smaller near the exit 78 than it is near the plenum 74. Additionally, the interwall distance 88 may vary from coanda injector to coanda injector, whether the coanda injectors are located within the same or different nozzles.

The exit 78 is formed at a nozzle station denoted as 83. As used herein, the term "nozzle station" refers to an axial location within the nozzle as measured from some reference origin. In one form, each of the walls 75 and 77 terminate at the exit 78 at the station 83, though in other forms either wall may terminate upstream or downstream of the station 83. Pressurized air discharged from the exit 78 may flow tangential to a contour 84 of the nozzle 60 which in some forms may be in the same direction as the exhaust flow stream 72. Though the bulk of the discharge air from the exit 78 may be tangential, some embodiments may include a component perpendicular to the exhaust flow stream 72.

A wall thickness 87 may be selected according to the requirements of any given application. To set forth just a few non-limiting examples, a design constraint may impose a large value on the wall thickness 87 in one application, but may impose a small value in another. The wall thickness 87 generally extends at a right angle with respect to the exhaust flow stream 72, but some embodiments may have a tapered or angled wall thickness.

The coanda surface 84 provides a surface over which pressurized air from the coanda injector 69 may flow after being discharged from the exit 78. In the illustrative embodiment, the coanda surface 84 is curved with a radius of a curvature 86, but in other embodiments it may have a variety of shapes which are not limited to a constant radius of a curvature. For example, some embodiments may have a coanda surface having a variable radius of a curvature along the length of the surface, while other surfaces may be flat or nearly flat to set forth just a few non-limiting examples.

The fluidic injector 71 is operable to flow pressurized air at a variety of flow rates and in one form includes a plenum 89, a conduit 80, and an exit 82. Pressurized air from the compressed air subassembly 54 (FIG. 1) may be delivered to the plenum 89 before being conveyed by the conduit 80 to the exit 82. Though the fluidic injector 71 of the illustrative embodiment includes the plenum 89, alternative embodiments may not include the plenum 89.

In one form the conduit 80 is defined in part by walls 79 and 81 and extends between the plenum 89 and the exit 82. The walls 79 and 81 in the illustrative embodiment are separated by an interwall distance 90 which may vary along the length of the conduit 80. The interwall distance 90 may be a minimum at the exit 82 and a maximum near the plenum 89. Some embodiments may have a constant interwall distance 90. In addition, the interwall distance 90 may vary from fluidic injector to fluidic injector, whether the fluidic injectors are located within the same or different nozzles.

In one form the exit 82 is defined by the termination of the walls 79 and 81. Pressurized air may be discharged from the exit 82 to flow at a right angle relative to the contour 85 of the nozzle 60, which may also be normal to the exhaust flow stream 72. Other embodiments may include exits 82 arranged to discharge air at an angle relative to the exhaust flow stream 72, but still maintain a component that is normal to the exhaust flow stream 72.

The corner of the wall 81 in proximity to the exit 82 of the fluidic injector 71 may be coincident with the exit 78 of the coanda injector 69. Since the wall 81 forms part of the exit 82 of the fluidic injector 71, the exit 82 of the fluidic injector 71 may be coincident with the exit 78 of the coanda injector 69. Other embodiments, however, may locate the exit 82 of the fluidic injector 71 downstream of the exit 82 of the coanda injector 69.

Figure 3:
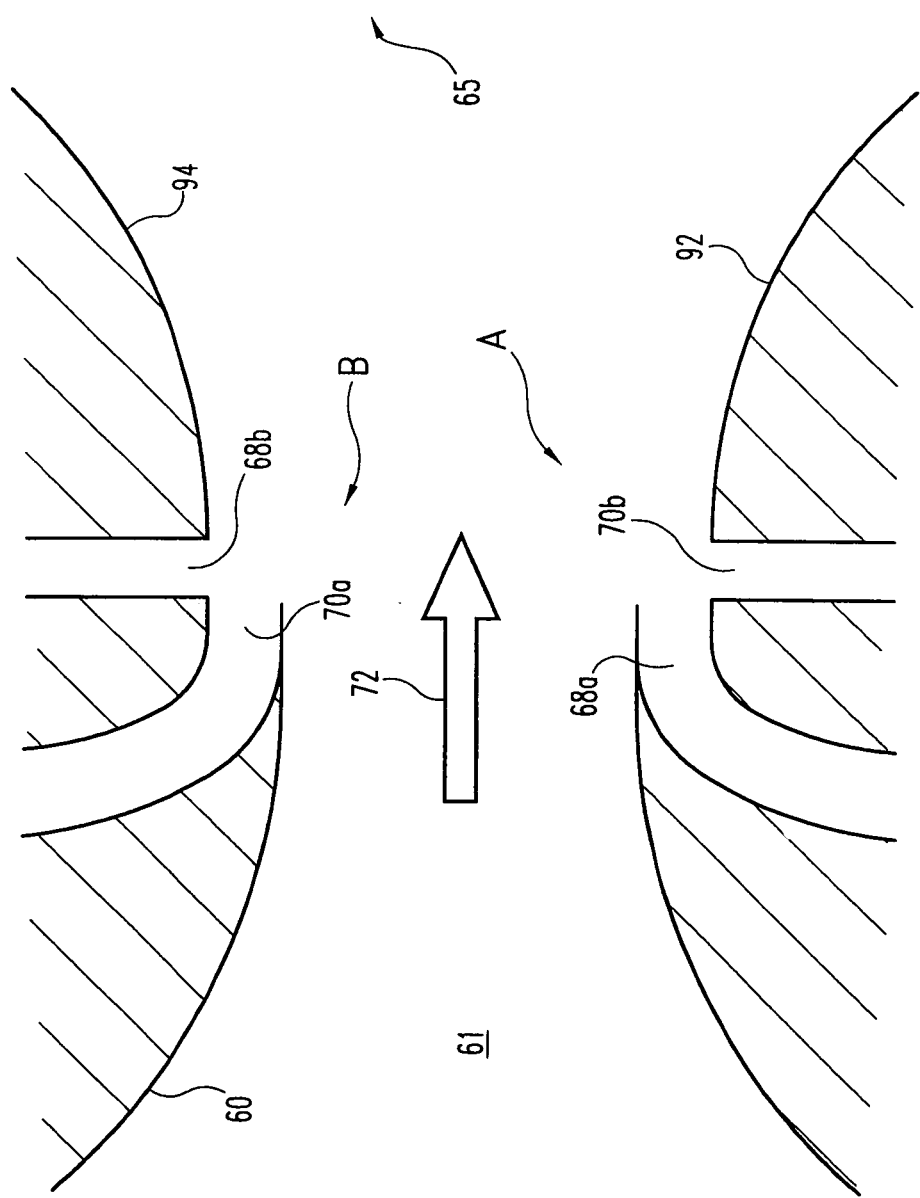
FIG. 3 is an illustrative view of one embodiment of a nozzle.

Turning now to FIG. 3, a schematic of another embodiment of the nozzle 60 is shown having coanda injectors 68a and 70a as well as fluidic injectors 68b and 70b. The injectors 68a, 68b, 70a, and 70b receive pressurized air from the compressed air subsystem 54 (shown in FIG. 1) and may collectively or alternatively discharge the pressurized air into the interior 61 of the nozzle 60. During operation, the injectors 68a, 68b, 70a, and 70b, may be capable of flowing pressurized air at a variety of flow rates which may or may not be similar. In addition, one or more of the injectors 68a, 68b, 70a, and 70b, may not be flowing pressurized air while the remaining injectors are operating For ease of description that follows, the injectors may be paired together in at least two ways. The coanda injector 68a located on one side of the nozzle 60 may be paired with the fluidic injector 68b on another side of the nozzle 60 to create an injector subsystem 68a/68b; likewise, the coanda injector 70a and the fluidic injector 70b may be paired and referred to as an injector subsystem 70a/70b. The pairing of injectors located in separate areas of the nozzle 60 may assist in altering a direction of the exhaust flow stream 72 which will be discussed further hereinbelow. The pairing of injectors may, but need not, be on opposite sides of the nozzle 60. In another pairing, a pair of injectors located on the same side of the nozzle 60 may be referred to as an injector assembly and will be designated herein with capital letters to distinguish it from the numerals which designate the injector subsystem pairing. For example, an injector assembly A includes the coanda injector 68a and the fluidic injector 70b, while an injector assembly B includes the coanda injector 70a and the fluidic injector 68b. Grouping the injectors into the injector subsystems 68a/68b and 70a/70b and the injector assemblies A and B provides for ease of discussion regarding, but not limited to, altering a direction of the exhaust flow 72, or regarding the manufacture, construction, building, and/or assembly of a nozzle having various arrangements of the coanda and fluidic injectors.

In one operational use of the injectors, a fluidic injector on one side of the nozzle 60 may be activated at or near the same time as the coanda injector on the opposite side of the nozzle. For example, the coanda injector 70a may be activated to flow pressurized gas at or near the same time as the fluidic injector 70b. When operated, the fluidic injector 70b enhances and/or creates a downstream separated flow region of the nozzle 60. For its part, the coanda injector 70a may add momentum to the nozzle flow to keep it attached along a coanda surface 94 that is located on the same side of the nozzle 60 as the coanda injector 70a. The combined effects may provide for a turning, or vectoring, of the exhaust flow stream 72 away from the axial direction. In one non-limiting example, the operation of the injectors 70a and 70b may provide for a turning of the exhaust flow toward the coanda injector. If an opposite turning or vectoring is desired, then the coanda injector 68a and the fluidic injector 68b may be activated. The injectors 68a, 68b, 70a, and 70b may also be operated simultaneously if desired.

The injectors 68 and 70 may be used in various operational conditions that include variations in the nozzle pressure ratio and variations in the mass flow rate of the injectors. For example, the injectors may be used in conditions that vary from low pressure ratio to high pressure ratio, where the pressure ratio is defined as nozzle total pressure to ambient static pressure. Computational studies predict that in high pressure ratio operation, e.g. ratios above about 2.0, the fluidic injector and coanda injector configuration of the instant application may be able to vector an exhaust flow through about 10 degrees. In some forms, each of the individual injectors 68a, 68b, 70a, and 70b may receive up to 3% of engine airflow from the compressed air subsystem 54. Some embodiments, however, may utilize greater or lesser amounts of engine airflow.

Table 1 depicts various geometric and aerodynamic details for one embodiment of the present application. The table lists information from three-dimensional as well as two-dimensional computational studies. FLICS designates the Fluidic Injection Coanda Surface system of injectors.

TABLE 1

| Three-Dimensional Results: |
| --- |
| SLS Conditions (Pamb = 14.7 psi, Tamb = 518.7 R) |
| Nozzle PR = 3.4 |
| FLICS PR = 6.8 |
| Nozzle AR = 4 |
| Turbine exit area: 580 in^2 |
| Nozzle exit area: 258 in^2 |
| FLICS nozzle widths: 0.050 in |
| Coanda surface radius: 3 inches |
| FLICS flow: 6% of primary |
| Two-Dimensional Results: |
| Injection Flow/Primary Flow: ~2.5% |
| Tangential Flow/Primary Flow: ~2.6% |

Figure 4:
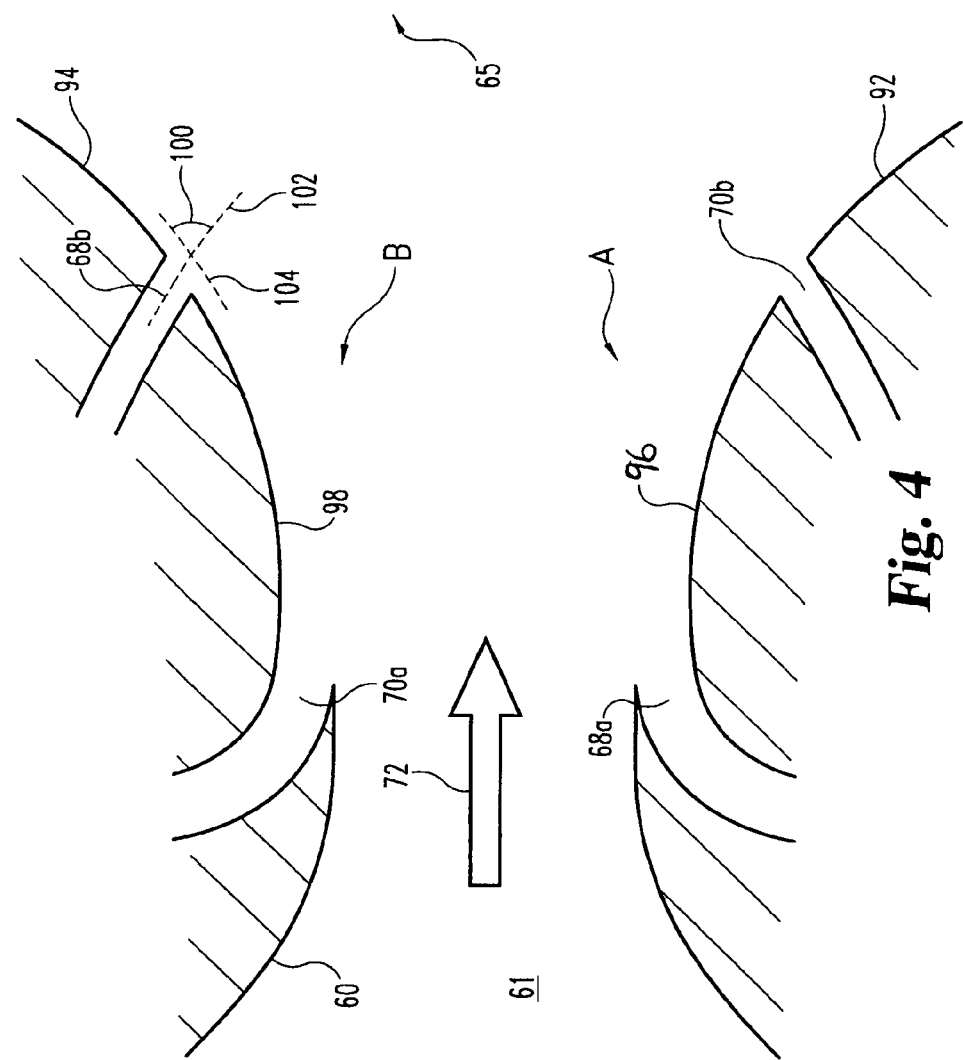
FIG. 4 is an illustrative view of one embodiment of a nozzle.

FIG. 4 depicts another embodiment of the nozzle 60 of FIG. 3, wherein like numerals refer to like elements. The injector assemblies A and B of FIG. 3 are characterized in that the fluidic injectors 68b and 70b are located axially downstream of the coanda injectors 68a and 70a, respectively. Intermediate coanda surfaces 96 and 98 are disposed between the coanda injectors and the fluidic injectors. The intermediate coanda surfaces 96 and 98, together with the coanda surfaces 94 and 92, may form a surface over which pressurized air discharged from the coanda injectors 68a and 70a may flow. Though surfaces 92 and 94 are described as "coanda" surfaces, in some forms the surfaces may or may not form part of a coanda flow effect.

The fluidic injectors 68b and 70b are angled with respect to the surfaces 94, 98 and 92, 96. For ease of discussion below, reference will be made to the fluidic injector 68b, although the same principles apply to the fluidic injector 70b. An angle 100 may be defined between a reference axis 102 of the fluidic injector 68b and a reference line 104 which is drawn tangent to a contour of an inner nozzle surface that passes through the fluidic injector 68b. The angle 100 may be any value so long as a component of the pressurized air exiting the fluidic injector 68b is orthogonal to the reference line 104 and/or orthogonal to a fluid flow stream passing over the exit of the fluidic injector 68b when not in operation. In some embodiments, the angle 100 may be normal to the either surface 94 or 98.

FIGS. 5a, 5b, 5c, and 5d depict several different embodiments of the nozzle 60 and the injectors used within the nozzle 60. It should be noted that the views depicted in FIGS. 5a, 5b, 5c, and 5d are taken at an arbitrary nozzle station in the direction of an exhaust flow. In one aspect, the cross sectional shapes of the nozzle 60 which are perpendicular to the flow stream, may vary across various embodiments of the nozzle 60 as may be seen by the quadrilateral shapes of FIGS. 5a and 5b, the elliptical shape of FIG. 5c, and the triangular shape of FIG. 5d. Other shapes, however, are also contemplated herein. For example, the nozzle cross sectional shapes may also include a circle, a pentagon, or a hexagon, to set forth just a few non-limiting examples. In some forms the nozzle may have a variety of cross sectional shapes in the direction of an exhaust flow. In still other forms, the nozzle may have a number of fluidic injectors placed at a variety of flow sections along a nozzle that changes cross sectional shapes.

Figure 5B:
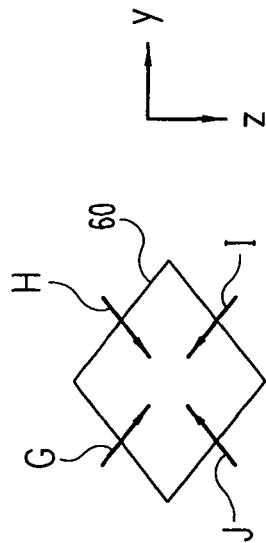
FIG. 5b is an illustrative view of one embodiment of a nozzle.
Figure 5D:
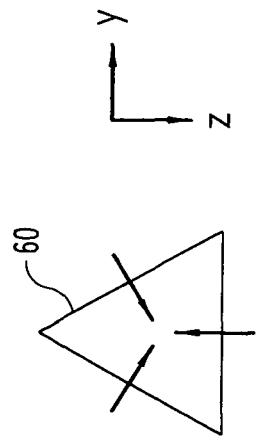
FIG. 5d is an illustrative view of one embodiment of a nozzle.
Figure 5A:
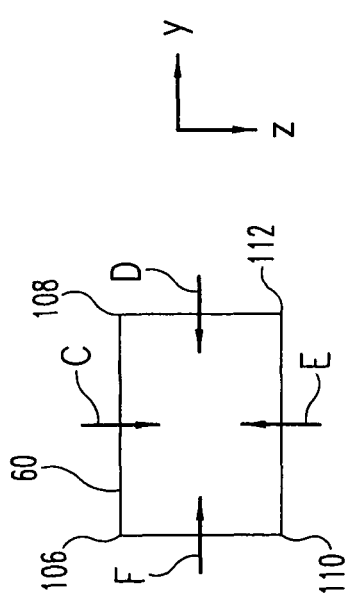
FIG. 5a is an illustrative view of one embodiment of a nozzle.
Figure 5C:
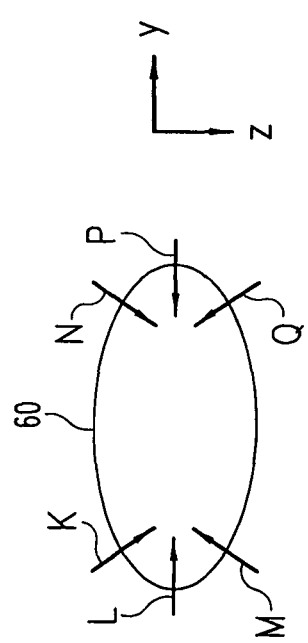
FIG. 5c is an illustrative view of one embodiment of a nozzle.

Some embodiments of the nozzle 60 may include any number of injector subsystems, including a single subsystem, or a plurality of subsystems. For example, four injector subsystems C, D, E, and F are depicted in FIG. 5a. FIG. 5c depicts six injector subsystems. Other nozzles may have fewer or greater numbers of injector subsystems.

Other embodiments may orient the injector subsystems with respect to a defined axis system. To set forth just one non-limiting example, each of the injector subsystems in C, D, E, and F are aligned parallel with aircraft body axes y and z which may provide multi-axis vectoring of the exhaust flow about the y or z axes. In some embodiments, however, the injector subsystems may not be parallel with the aircraft body axes. To set forth just one non-limiting example, injector subsystems G, H, I, and J are not aligned with the body axes y and z in FIG. 5b. The vectoring provided by the injector subsystem arrangement in FIG. 5b may produce off-axis or blended vectoring such that the exhaust flow may be vectored having components in both the y and z axes. Other arrangements are also contemplated, such as those in FIGS. 5c and 5d, to set forth just two non-limiting examples.

Other embodiments of the nozzle 60 may include injectors that extend various lengths around the periphery of the nozzle 60. To set forth just one non-limiting example, the injector subsystem C in FIG. 5a may extend from a corner 106 to a corner 108. In another non-limiting example, the injector subsystem C may extend only partially between the corners 106 and 108. Opposing injector subsystems, such as, but not limited to, the subsystems C and E, may be mirror images or may extend to different lengths. To set forth just one non-limiting example, the injector subsystem C may fully extend between the corners 106 and 108, while the injector subsystem E may only extend partially between corners 110 and 112.

Some embodiments may include a nozzle having a cluster of injector subsystems, as may be seen in FIG. 5c. Injector subsystems K, L, and M are depicted as clustered on one side of the nozzle 60, while injector subsystems N, P, and Q are clustered on the other.

Though the embodiments of nozzles 60 of FIGS. 5a, 5b, 5c, and 5d are depicted as having injector subsystems, some embodiments of the nozzle 60 may only include a single injector at one or more location that depicts an injector subsystem. To set forth just one non-limiting example, the injector subsystem C of FIG. 5a may be replaced with a single coanda or fluidic injector.

Figure 6:
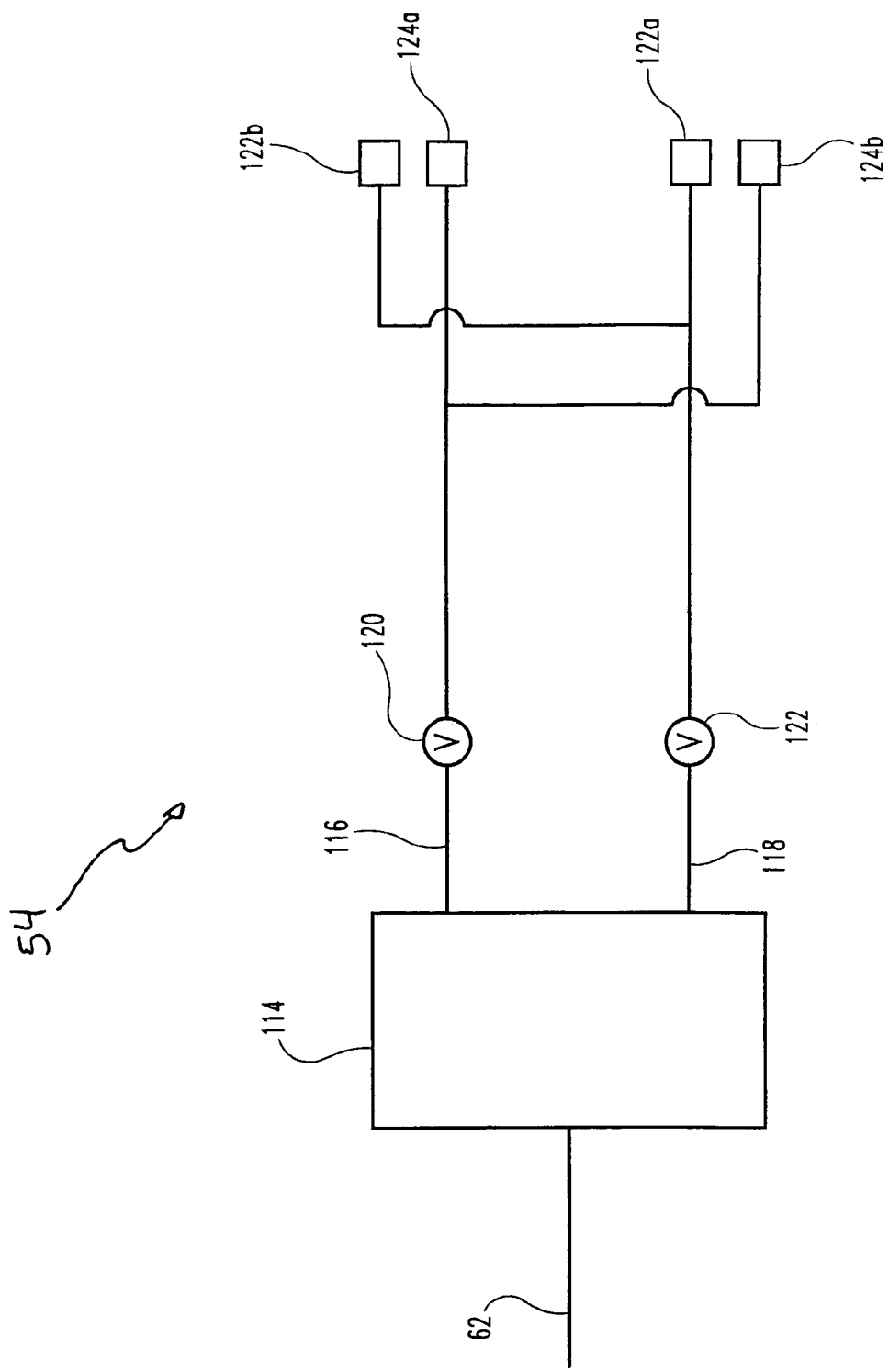
FIG. 6 is a schematic of one embodiment of a compressed air subsystem.

FIG. 6 depicts one embodiment of the compressed air subsystem 54. The conduit 62 may receive pressurized air from a source such as, but not limited to, a compressor discharge and may provide the pressurized air to a plenum 114. Conduits 116 and 118 may be coupled with the plenum 114 and may be configured to supply the pressurized air through valves 120 and 122 to injectors 122a, b and 124 a, b. The valves 120 and 122 may be any type of valve, similar in that respect to the valve 64 discussed above. Pressurized air may be flowed from the plenum 114 to the injectors 122a and 122b by changing the operating condition of the valve 122. Similarly, pressurized air may be flowed from the plenum 114 to the injectors 124a and 124b by changing the operating condition of the valve 120.

One embodiment of the present application includes a pair of injectors that provide pressurized air to a nozzle of a gas turbine engine. One injector of the pair of injectors is a coanda injector and the other is a fluidic injector. The coanda injector and the fluidic injectors may be located on opposite walls of the nozzle. The fluidic injector, furthermore, may be located at a downstream location of the coanda injector.

Another embodiment of the present application includes a nozzle having a first injection discharge opening located at a first flow stream location in the nozzle and operable for flowing fluid in a tangential direction relative to a surface of the nozzle, a second injection discharge opening located at a second flow stream location and operable for flowing fluid in a non-tangential direction relative to the surface of the nozzle, wherein the first flow stream location is coincident with or upstream of the second flow stream.

A further embodiment of the present application includes an aircraft nozzle operable to convey a flow stream, a pressurized air device operable to deliver pressurized air to the nozzle, and means for vectoring the flow stream of the nozzle.

Yet a further embodiment of the present application includes a high pressure ratio nozzle capable of flowing a fluid stream and having a nozzle axis, wherein the high pressure ratio nozzle is operable at a pressure ratio greater than about 2.0, wherein the pressure ratio is defined as the ratio of nozzle total pressure to ambient static pressure, and an injector system operable to vector the fluid stream to angles greater than about 2 degrees relative to the nozzle axis.

Yet still another embodiment of the present application includes operating a gas turbine engine to produce an exhaust flow, flowing the exhaust flow through a converging diverging nozzle, routing pressurized air to a fluidic injector and a coanda injector, injecting pressurized air into the nozzle through the fluidic injector and the coanda injector, wherein the injecting includes providing a delivery of pressurized air through the fluidic injector at a position coincident with or downstream of a delivery of pressurized air through the coanda injector, and generating a thrust vector angle.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A thrust vectoring device useful for aircraft, the device comprising:
   a nozzle having an upstream portion structured to flow an exhaust stream from a turbomachinery component of a gas turbine engine, the nozzle also having a first injection discharge opening located at a first flow stream location in the nozzle and operable for flowing fluid in a tangential direction relative to a surface of the nozzle, and a second injection discharge opening located at a second flow stream location and operable for flowing fluid in a non-tangential direction relative to the surface of the nozzle, the first injection discharge opening and the second injection discharge opening structured to receive a discharge stream from a gas path from within the gas turbine engine and direct the discharge stream to alter a direction of the exhaust stream that is flowed through the nozzle;
   wherein the first flow stream location is coincident with or upstream of the second flow stream location;
   wherein the first injection discharge opening is located on one side of the nozzle and the second injection discharge opening is located on another side of the nozzle, wherein the first injection discharge opening and the second injection discharge opening are collectively referred to as an injection discharge subsystem; and
   wherein the nozzle includes a plurality of injection discharge subsystems, the plurality of injection discharge subsystems operable together to produce a change in direction of a nozzle flow stream;
   wherein the first injection discharge opening is a coanda injector and the second injection discharge opening is a fluidic injector, and wherein at least one of the injection discharge subsystems includes the first flow stream location to be axially coincident with the second flow stream location.

2. The thrust vectoring device of claim 1, wherein the first injection discharge opening is located on the opposite side of the nozzle as the second injection discharge opening.

3. The thrust vectoring device of claim 1, wherein the nozzle is coupled to the gas turbine engine, the gas turbine engine including a compressor in fluid communication with both the coanda injector and the fluidic injector.

4. The thrust vectoring device of claim 1, wherein the compressor is capable of providing up to about 3% of the gas turbine engine airflow to at least one of the first injection discharge opening and the second injection discharge opening.

5. The thrust vectoring device of claim 1, wherein the nozzle is a convergent-divergent nozzle.

6. The thrust vectoring device of claim 1, wherein the second injection discharge opening is oriented substantially normal to a nozzle surface.

7. The thrust vectoring device of claim 1, wherein a cross sectional shape of the nozzle comprises one of a circle, quadrilateral, a triangle, and an ellipse.

8. The thrust vectoring device of claim 1, wherein the nozzle is a high pressure ratio nozzle operable at pressure ratios greater than about 2.0.

9. The thrust vectoring device of claim 8, wherein the nozzle is operable to vector a nozzle fluid flow greater than about 2 degrees from a nozzle axis.

10. The thrust vectoring device of claim 9, wherein the nozzle is operable to vector a nozzle fluid flow to at least 10 degrees.

11. The thrust vectoring device of claim 1, wherein the nozzle is a supersonic nozzle.

12. An apparatus comprising:
an aircraft nozzle operable to convey a flow stream
a first injector pair paired means for vectoring the flow stream of the nozzle; and
a second injector pair for vectoring the flow stream of the nozzle located opposite the first injector pair;
wherein the first injector pair includes a coanda injector at a first stream location and a fluidic injector at a second stream location;
wherein the second injector pair includes a coanda injector at the first stream location and a fluidic injector at the second stream location;
wherein the coanda injectors operable for flowing fluid in a tangential direction relative to a surface of the aircraft nozzle, and the fluidic injectors operable for flowing fluid in a non-tangential direction relative to the surface of the aircraft nozzle;
wherein the first stream location is axially coincident with the second stream location.

13. The apparatus of claim 12, wherein the fluidic injector of the first injector pair produces a separated flow region on one side of the nozzle and wherein the coanda injector of the second injector pair adds momentum to the flow stream on an opposite side of the nozzle; and wherein the fluidic injector of the second injector pair produces a separated flow region on one side of the nozzle and wherein the coanda injector of the second injector pair adds momentum to the flow stream on an opposite side of the nozzle.

14. The apparatus of claim 12, where the aircraft nozzle is defined by a gas turbine engine nozzle.

15. The apparatus of claim 14, wherein the gas turbine engine nozzle is operable at pressure ratios greater than about 2.0, and the first injector pair and second injector pair are operable to vector the flow stream to angles greater than about 2 degrees.

16. A method comprising:
operating a gas turbine engine to produce an exhaust flow;
flowing the exhaust flow through a converging diverging nozzle;
routing pressurized air to a plurality of fluidic injectors and a plurality of coanda injectors, wherein the coanda injectors operable for flowing fluid in a tangential direction relative to a surface of the nozzle, and the fluidic injectors operable for flowing fluid in a non-tangential direction relative to the surface of the nozzle;
the plurality of fluidic injectors each located in separate regions of the converging diverging nozzle and paired with the plurality of coanda injectors to form at least a first injector pair and a second injector pair;
wherein the first injector pair includes a coanda injector at a first stream location and a fluidic injector at a second stream location;
wherein the second injector pair includes a coanda injector at the first stream location and a fluidic injector at the second stream location;
wherein the first stream location is axially coincident with the second stream location;
injecting pressurized air into the nozzle through the plurality of fluidic injectors and the plurality of coanda injectors, wherein the injecting includes providing a delivery of pressurized air through the plurality of fluidic injectors at a position coincident with delivery of pressurized air through the plurality of coanda injectors; and
generating a thrust vector angle.

17. The method of claim 16, which further includes vectoring the exhaust flow with the plurality of fluidic injectors and the plurality of coanda injectors, wherein the injecting includes providing a delivery of pressurized air through the plurality of fluidic injectors at a position coincident with the delivery of pressurized air through the plurality of coanda injectors.

18. The method of claim 16, wherein the generating includes producing a thrust vector angle up to at least about 10 degrees.

19. The method of claim 16, which further includes controlling an aircraft by generating the thrust vector angle.

20. The method of claim 16, wherein the generating of a thrust vector angle further includes separating a flow in one area of the nozzle.

* * * * *

UNITED STATES PATENT AND TRADEMARK OFFICE
CERTIFICATE OF CORRECTION

| | | |
|---|---|---|
| PATENT NO. | : 8,800,259 B2 | Page 1 of 1 |
| APPLICATION NO. | : 12/284389 | |
| DATED | : August 12, 2014 | |
| INVENTOR(S) | : Smith, III et al. | |

It is certified that error appears in the above-identified patent and that said Letters Patent is hereby corrected as shown below:

In the claims,

Col. 9, lines 8-9 (Claim 12, lines 3-4): remove the term "paired means" so that the claim reads:

"...a first injector pair for vectoring the flow stream of the nozzle; and..."

Signed and Sealed this
Sixth Day of January, 2015

Michelle K. Lee
*Deputy Director of the United States Patent and Trademark Office*